(12) United States Patent
Olshansky et al.

(10) Patent No.: US 7,706,356 B1
(45) Date of Patent: *Apr. 27, 2010

(54) MAPPING OF IP PHONES FOR E911

(75) Inventors: Robert Olshansky, Wayland, MA (US); Eric R. Sporel, Westford, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/318,836

(22) Filed: Dec. 28, 2005

(51) Int. Cl.
*H04L 12/66* (2006.01)

(52) U.S. Cl. .................. 370/352; 370/351; 370/353; 370/354; 370/355; 370/356; 379/45; 379/106.01; 379/201.06; 379/201.1; 455/456.5; 709/224

(58) Field of Classification Search ............ 379/207.13, 379/88.21, 93.03, 45, 106.01, 201.06, 201.1; 370/351, 352, 353, 354, 355, 356; 455/456.5; 709/224

See application file for complete search history.

(56) References Cited

U.S. PATENT DOCUMENTS

| | | | |
|---|---|---|---|
| 6,501,421 B1 | 12/2002 | Dutta et al. | |
| 6,687,245 B2* | 2/2004 | Fangman et al. | 370/356 |
| 6,819,929 B2 | 11/2004 | Antonucci et al. | |
| 7,127,044 B1 | 10/2006 | Becker et al. | |
| 7,130,385 B1 | 10/2006 | Moon | |
| 7,227,941 B2 | 6/2007 | Baumeister et al | |
| 2003/0109245 A1 | 6/2003 | McCalmont et al. | |
| 2003/0169751 A1 | 9/2003 | Pulkka et al. | |
| 2004/0190497 A1* | 9/2004 | Knox | 370/352 |
| 2005/0083911 A1* | 4/2005 | Grabelsky et al. | 370/352 |
| 2005/0213716 A1 | 9/2005 | Zhu et al. | |
| 2005/0270560 A1 | 12/2005 | Ferlitsch | |
| 2006/0043164 A1 | 3/2006 | Dowling et al. | |
| 2006/0056388 A1 | 3/2006 | Livingood | |
| 2006/0193447 A1 | 8/2006 | Schwartz | |
| 2006/0274725 A1* | 12/2006 | Freitag et al. | 370/352 |
| 2007/0104183 A1* | 5/2007 | Bakke et al. | 370/352 |

OTHER PUBLICATIONS

"Cisco Emergency Responder Version 1 2(2)," Cisco Systems, Inc. (1992-2004), pp. 1-7.
"Location Services for IP," Nortel (May 9, 2005), pp. 1-40.

* cited by examiner

*Primary Examiner*—Hemant Patel

(57) ABSTRACT

A system including a first network configured to receive IP device data from an IP device and to provide one or more IP addresses of the IP device based on the IP device data; a second network comprising: a second network location database configured to store physical location information, and a second network location server configured to receive the one or more IP addresses of the IP device from the first network, and query the second network location database to determine physical location information of the IP device based on the one or more IP addresses.

17 Claims, 9 Drawing Sheets

MAPPING OF IP PHONES FOR E911

CROSS REFERENCE TO RELATED PATENTS

The present invention relates to the following co-pending commonly owned U.S. patent application: "E911 Location Server," filed Nov. 16, 2005, Ser. No. 11/274,301.

BACKGROUND INFORMATION

For a Public Switched Telephone Network (PSTN) service, telephone numbers are tied to a physical infrastructure and known physical addresses. If a user places a 911 call from a telephone having one of these stationary telephone numbers, the physical address for the telephone can be determined by querying an Automatic Location Identification (ALI) database.

For Internet Protocol (IP) phones, the above scenario is not possible because the IP phones can be easily moved from one physical location to another. These IP phones can re-register for service wherever the IP phone can establish an IP connection. In addition, IP phones can be located as "softphones"—software-implemented phones—on IP-capable mobile devices, such as laptops and handheld devices.

Another problem is an IP phone can be assigned a traditional telephone number (e.g., NPA-XXX-XXXX) that is normally associated with a totally different number plan area (area code) and prefix from its actual physical location. The IP phone having a corresponding telephone number may not have a relationship to its corresponding number plan area and prefix for its home location even for an IP phone physically at its home location.

Yet another problem is that several different IP phones, each of which are located at different physical locations, can be registered to the same traditional telephone number. This would be a generalization of the concept of phone extensions, except that for Voice over Internet Protocol (VoIP, also known as Internet Telephony), the extensions can be geographically dispersed and nomadic. Therefore, it is difficult to determine the location of each of the IP phones.

DESCRIPTION OF THE PREFERRED EMBODIMENTS

Reference will now be made in detail to the exemplary preferred embodiments implemented according to the invention, the examples of which are illustrated in the accompanying drawings. Wherever possible, the same reference numbers will be used throughout the drawings to refer to the same or like parts.

Figure 1:
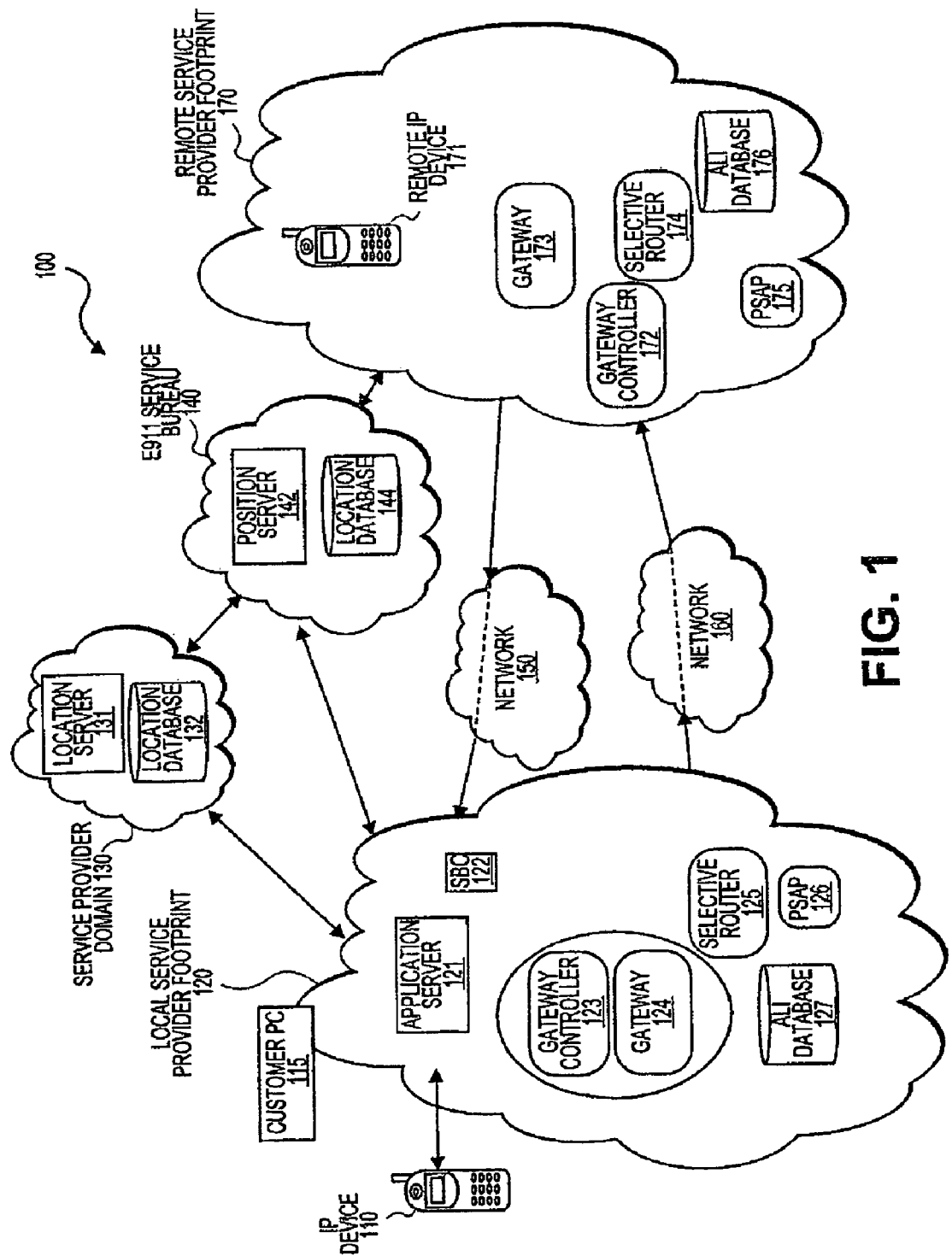
FIG. 1 is a block diagram of an exemplary emergency call network.

FIG. 1 is a block diagram of an exemplary emergency call network. The exemplary emergency call network 100 can be any type of system that transmits information over a network. For example, emergency call network 100 can be a VoIP system that communicates using data packets that are transmitted over the Internet or some other Internet Protocol (IP) capable network. Emergency call network 100 includes an IP device 110, a personal computer (PC) 115, local service provider footprint 120, a service provider domain 130, a Service Bureau 140, various networks 150, 160, and a remote service provider footprint 170.

IP device 110 is a device that allows a user to speak to other remote users. For example, IP device 110 can be an IP phone or any device that allows users to make a telephone call using IP transmissions. In some embodiments, IP device 110 may also be a telephone based on a wireless system, for example, an IP cellular telephone, a cellular telephone, or a telephone based on a satellite system. IP device 110 may be a conventional smart phone, such as a PC phone, a Session Initiation Protocol (SIP) phone, and a phone based on the call control standard commonly referred to as H323, which can process signals based on voice and/or Dual Tone Modulation Frequency (DTMF) tones. In some embodiments, IP device 110 may also include a Wireless Access Protocol (WAP) client, such as a cellular telephone, a Personal Digital Assistant (PDA), and a HyperText Transfer Protocol (HTTP) client, such as an Internet browser, which can process signals based on text. As used herein, IP device includes, but is not limited to, all of the above and is not intended to be restrictive in any way.

As shown in FIG. 1, P device 110 may be connected to the local service provider footprint 120 via a conventional telephone line, a cable television line, a Digital Subscriber Line (DSL), an Integrated Services Digital Network (ISDN) line, a wireless transmission, and/or another communications line. The IP device 110 may also be connected to the service provider footprint 120 through an intermediary. For example, the IP device 110 may be connected to the service provider footprint 120 via a base station and a switch, such as a base station and a switch for a cellular telephone.

PC 115 can include a processor (CPU) and a memory system including various memories such as RAM, disc drives, etc. Each of the PCs 115 may also include a display or monitor, a keyboard, and possibly one or more additional user input devices (not shown) such as a mouse, joystick or track ball. Typically, the software running on the PC 115 includes an operating system, such as Windows, and a series of compatible application programs running under the operating system. The software preferably implements a graphical user interface, including a user interface for communications to the local service provider footprint 120.

PC 115 can have voice communication capabilities. For example, PC 115 can include a microphone and one or more speakers. PC 115 can also include analog to digital and digital to analog converters, and the CPUs in such PC 115 may run software for compression and decompression of digitized audio (typically voice) information. The software also processes the audio information for transmission and reception of the compressed digital information in IP packets and using the appropriate protocol, for communication with the respective access server.

Local service provider footprint 120 is a communication system. For example, the local service provider footprint 120 can be a wireline or cellular network using IP transport. Local service provider footprint 120 can communicate with a service provider domain 130, a E911 Service Bureau 140, and a remote service provider footprint 170 via network 160. Local service provider footprint 120 may include, among other things, an application server 121, a session border controller (hereinafter "SBC") 122, a gateway controller 123, a gateway 124, a selective router 125, a Public Safety Answering Point (PSAP) 126, and an Automatic Location Information (ALI) database 127.

Application server 121 is a server that includes software and/or hardware that allows it to receive communications or communicate with various other components located in the emergency call network 100. The application server 121 can register the IP device 110 and receive IP call signals from the SBC 122. The application server 121 can communicate with a position server 142 located at the E911 Service Bureau 140. In addition the application server 121 can transmit routing information to the local gateway controller 123 or a remote gateway controller 172 (further discussed below).

SBC 122 is a VoIP session-aware device that controls call admission to the emergency call network 100 at the border of that local service provider footprint 120, and optionally (depending on the device) performs a host of call-control functions to ease the load on the call agents within the network. In some instances, SBC 122 acts as a firewall so that a customer or another server provider cannot determine how a call is routed. In some embodiments, the SBC can hide external and internal IP addresses. In addition, the SBC can filter register messages and forward copies of the register messages to a location server.

Gateway controller 123 is configured to determine the location of IP device and its media capabilities so that a level of service can be chosen that may be possible for all users and operators. In some embodiments, the gateway controller 123 can be a CS2K Media Gateway controller provided by Nortel Networks. The gateway controller 123 receives routing and query data from the application server 121. Based on the routing data, the gateway controller 123 transmits query data to local gateway 124 or a remote gateway 173 (further discussed below). This communication between the gateway controller 123 and the local or remote gateway 124 or 173 can be conducted using a Media Gateway Control Protocol (MGCP) that handles signaling and session management for a multimedia conference.

Gateway 124 is a device that converts formatted data provided in one type of network to a particular format required for another type of network. Gateway 124, for example, may be a server, a router, a firewall server, a host, or a proxy server. The gateway 124 transforms telephone signaling information and voice data between packet-based (e.g., IP) and telephony protocols and sends the telephone signaling information, and later the voice data, to the selective router 125 over a voice trunk or a VoIP trunk. Gateway 124 may be capable of processing audio, video, and T.120 transmissions alone or in any combination, and is capable of full duplex media translations. Also, gateway 124 has the ability to receive query data signals from the gateway controller 123 to allow the local gateway 124 or the remote gateway 173 to connect to a selective router within the same footprint.

Selective router 125 is a router that provides the routing of a E911 call to the proper PSAP 126 based upon the ESRN (emergency services routing number). The ESRN is a ten-digit number used for routing to the correct Selective Router. The ESRN is determined by the location of the caller as recorded in an ALI database. The ESQK (emergency service query key) is a ten-digit number assigned by the Service Bureau that receives the 911 call. The ESQK enables the PSAP to correlate the call with an entry in the E911 ALI database that contains the location information and the caller's call back number.

In some embodiments, selective router 125 communicates with a selective router database, which provides the selective router 125 with information for tandem switching of the emergency call and to ensure the routing of emergency call to the proper PSAP 126 along with an automatic number identification (ANI).

PSAP 126 is an agency responsible for answering emergency calls for emergency assistance from police, fire, and ambulance services. For example, there are roughly 6,500 PSAPs across the United States, where the PSAPs are typically county or city controlled. The PSAP 126 includes an operator console so an operator can determine the location of the emergency caller. PSAP 126 is communicatively coupled to selective router 125 and the ALI database 127.

ALI database 127 is a database correlating ANI and ALI data with a physical location for each telephone connected to a local or remote network. The PSAP 126 uses the ALI database 127 to automatically display the physical location and telephone number of the IP device 110 being used to make the emergency call. Such information allows the PSAP 126 operator to direct the requested services to the proper location, and allows the PSAP 126 operator to call back in the event the connection is lost, or if more information is needed. If the ALI database 127 does not have the necessary information, the ALI database 127 can communicate with the Service Bureau 140 to get the necessary location and number data.

The service provider domain 130 is a group of computers and devices on a network that are administered as a unit with common rules and procedures and share a common name. The service provider domain 130 includes, among other things, a location server 131 and a location database 132. Location server 131 can receive location information from a PC application or from a web server, wherein the user manually inputs the location information into the PC application or the Web GUI. Location server 131 also provides location information updates to the E911 Service Bureau 140. Location server can also validate addresses against a master address guide such as Master Street Address Guide (MSAG). Location database 132 stores information relating to the location of a user.

The E911 Service Bureau 140 provides location and IP device 110 telephone number information to the ALI database 127. The E911 Service Bureau 140 is provisioned with the caller's service address, which may be used as the default static, or home, location as well as routing information to the selective router 125 and PSAP 126. In addition, the E911 Service Bureau 140 provides ESQK information to the local service provider footprint 120 to track the position of a user at an IP device 110. E911 Service Bureau 140, can be, for example, the Intrado Service Bureau. The E911 Service Bureau 140 can include a Service Bureau position server 142 and a Service Bureau location database 144

Service bureau position server 142 determines location information based on the IP device's 110 telephone number. Service bureau position server 142, for example, can be an Intrado Position Server. Service bureau position server 142 utilizes the IP device 110 (or 171, as discussed below) to determine the correct PSAP 126 (or 175) closest to the emergency site and returns the ESRN and the ESQK to the local service provider footprint 120.

Service bureau location database 144 is a database that stores location and number information of the static or nomadic IP devices 110 or 171. The service bureau location database 144 can be, for example, an Intrado location database. The Service Bureau location database 144 can be communicatively coupled to an ALI database at any service provider footprint.

Networks 150 and 160 allow remote footprints to communicate with each other. Networks 150 and 160 can be Internet Protocol Virtual Private Networks (IP-VPN), the Internet, or any other suitable network. In some embodiments, the networks 150 and 160 are private networks constructed across a public network or Internet. If the data is sent through a public network, the data sent across could be encrypted so the entire network is private. Consequently, in some embodiments, footprints may include encryption and decryption facilities so that the data transmitted across networks 150 and 160 remains private outside the footprint and public within the footprint.

Remote service provider footprint 170 is a communication system that can be similar to or different than the local service provider footprint 120. For example, the remote service provider footprint 170 can be a wireline or wireless IP network or any other type of communication system. Remote service provider footprint 170 can include, among other things, an application server (not shown), a SBC (not shown), a gateway controller 172, a gateway 173, a selective router 174, PSAP 175, and an ALI database 176, each of which have similar capabilities as those described above for the local service provider footprint 120.

Figure 2:
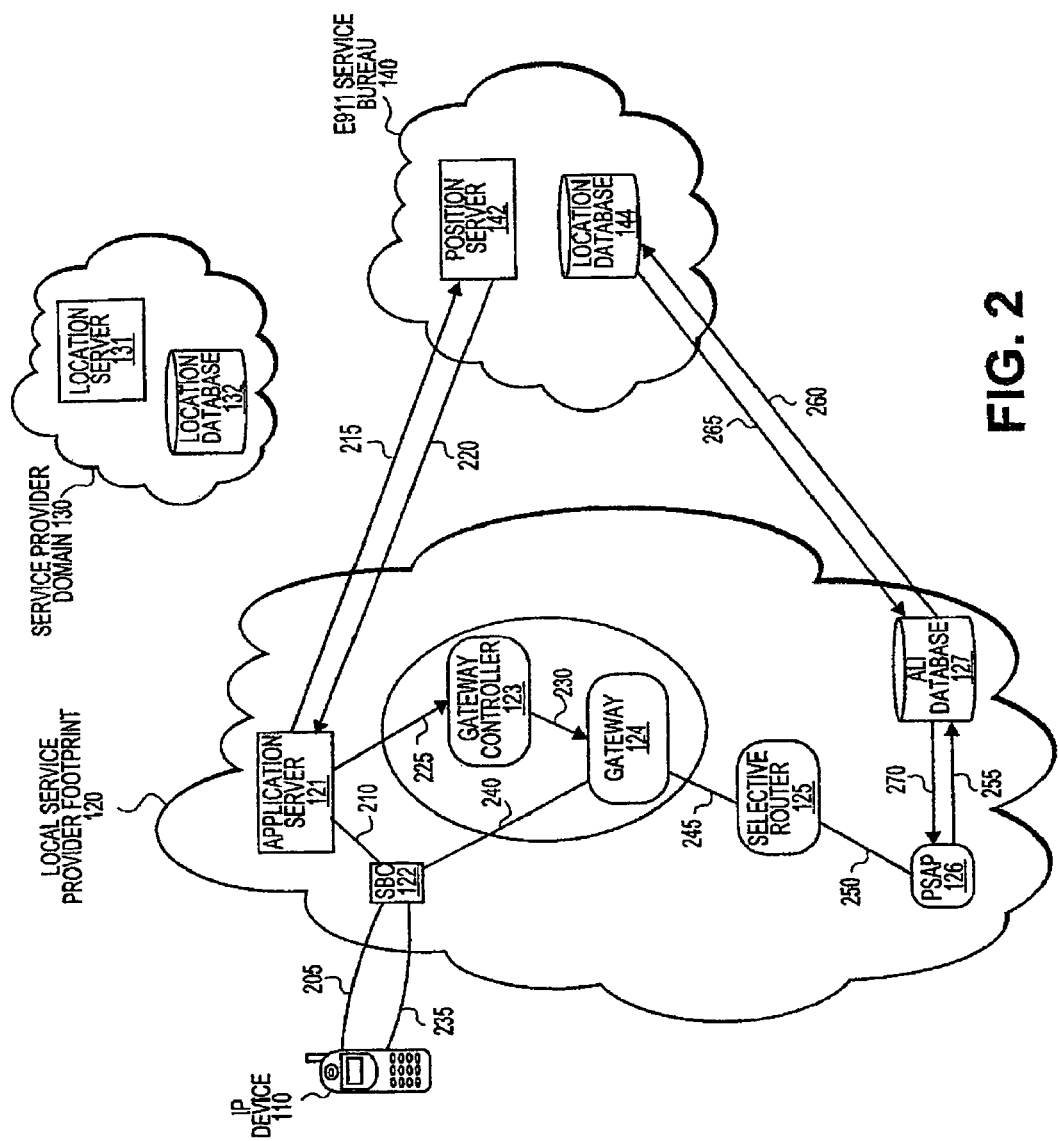
FIG. 2 is a functional diagram showing call flow in the exemplary system in FIG. 1 for providing emergency communication for a static emergency caller.

FIG. 2 is a functional diagram showing call flow in the exemplary system in FIG. 1 for providing emergency communication for a static VoIP emergency caller using direct trunking. First, the caller dials 911 from the IP device 110 and the IP device 110 transmits (205) the IP call signal to SBC 122. The IP call signal can include a telephone number or other identification of the IP device 110. Once the SBC 122 receives the IP call signal, the SBC 122 can perform call-control functions to the IP call signal. Then, the SBC 122 passes (210) the IP call signaling to the application server 121.

After receiving the IP call signaling from the SBC 122, the application server 121 queries (215) the position server 142 at the Service Bureau 140. For example, the querying can be done using an IP based GRIXE interface, communicating the telephone number, or other identification number, of the IP device 110 to the position server 142.

After the Service Bureau 140 has been queried, the position server 142 transmits (220) ESRN and ESQK parameters to the application server 121 at the local service provider footprint 120. The ESRN can facilitate routing to the appropriate selective router and the ESQK can facilitate routing to the correct PSAP. Also, the ESQK enables the PSAP to correlate the call with an entry in the E911 ALI database that contains the location information and the caller's call back number.

After the application server 121 receives the ESRN and the ESQK, the application server 121 signals (225) to the gateway controller 123 to connect to gateway 124, which interconnects with selective router 125. This allows the application server 121 to route the emergency call to the appropriate gateway controller 123 and gateway 124. The application server 121 can then remove the "911" and populate the called party number with 10 digit ESRN, which the gateway controller 123 can recognize as an emergency call destined to a specific selective router 125. In turn, the gateway controller 123 removes this 10 digit number, populates the called party number with "911". As a result, the gateway controller 123 connects (230) to the gateway 124 and provides the ESQK to the gateway 124 along with a dedicated (TDM) trunk.

After the gateway controller 123 connects to the gateway 124, the IP device 110 establishes (235) Real Time Protocol (RTP) communications with the SBC 122. As a result, the IP device 110 establishes (240) RTP communications with the gateway 124. Then, the gateway 124 converts the communication from IP to Time Division Multiplexing (TDM). The gateway 124 then passes (245) the direct trunking (TDM trunk) and the ESQK to the selective router 125.

The router 125 connects (250) the call (now TDM-based) to the PSAP 126, located at the local service provider footprint 120, using the E911 trunks that are based on the ESQK values. As a result, the PSAP 126 queries (255) the ALI database 127 to obtain the IP device's 110 ALI and Automatic Number Information (ANI) to be displayed at the operator console of the PSAP 126. If the ALI database 127 has the ALI and the ANI data, the ALI and ANI data is transmitted (270) to the operator console.

However, if the ALI and ANI data are not stored in the ALI database 127, the ALI database 127 performs a steering operation (260), based on the ESQK, to the location database 144 at the Service Bureau 140 to obtain the ALI data and the ANI data. The location database 144 provides (265) the ANI and ALI data to the ALI database 127. As a result, the ALI database 127 forwards (270) the ALI and ANI data to the PSAP 126 where it is displayed at the operator's console. Once the operator has the ALI and ANI data, the operator can determine the location of the user so that, if needed, an emergency help team can assist the user.

Figure 3:
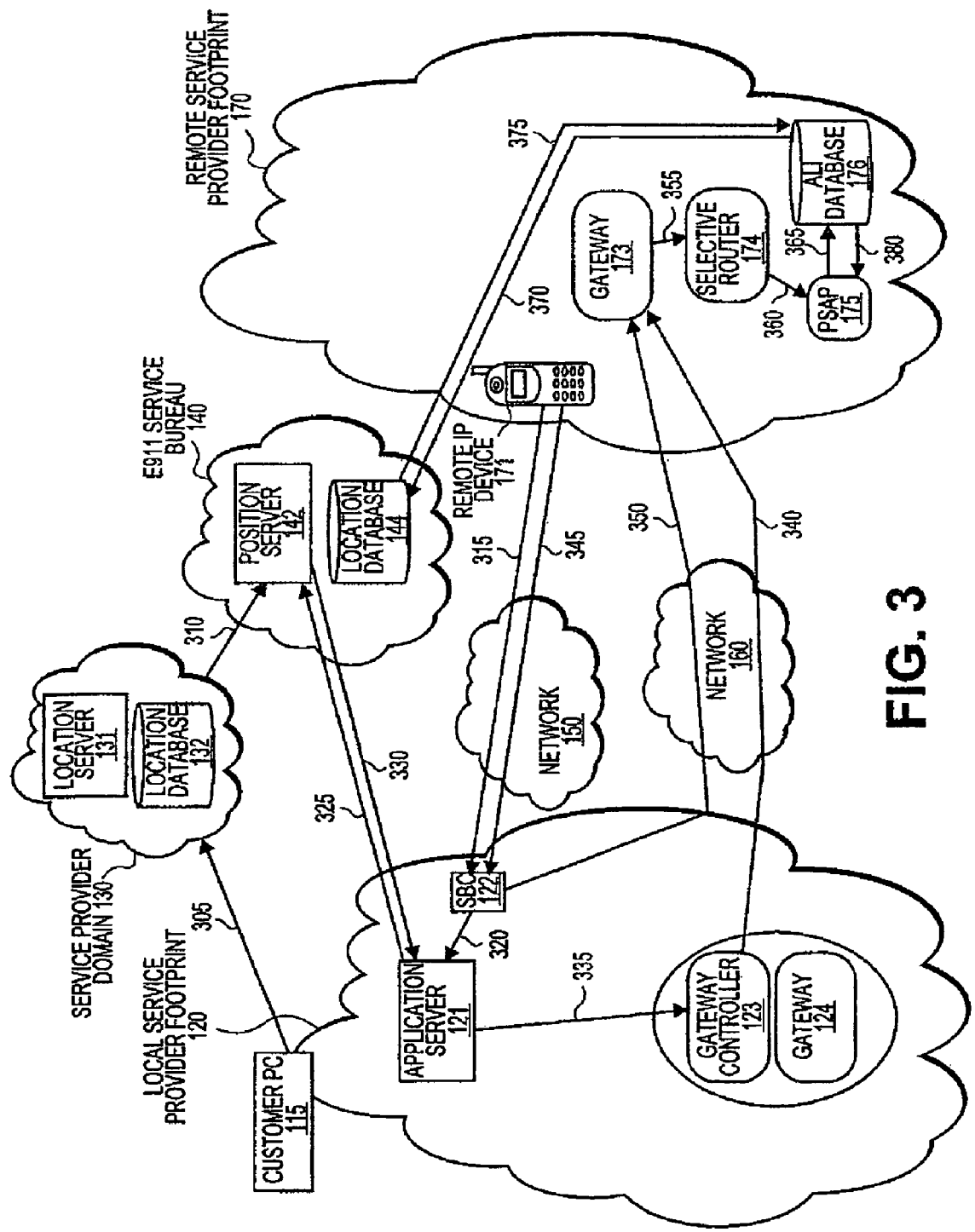
FIG. 3 is a functional diagram showing a first alternative call flow in the exemplary system in FIG. 1 for providing emergency communication for a nomadic emergency caller.

FIG. 3 is a functional diagram showing a first alternative call flow in the exemplary system in FIG. 1 for providing emergency communication for a nomadic emergency caller using direct trunking. First, prior to placing an emergency E911 call, the user manually updates the location of the remote IP device 171 at the PC 115. The PC transmits (305) this location information to the service provider domain 130. The location database 132 stores the location information of the nomadic remote device 171. In addition, the location server 131 at the service provider domain 130 forwards (310) the location information of the IP device to the position server 142 at the Service Bureau 140 to inform Service Bureau of the change of location of the remote IP device 171.

At some time after the Service Bureau 140 has received the remote IP device's location information, the caller dials 911 from the remote IP device 171 and the IP device 110 transmits (315) the IP call signal to the SBC 122 via network 150. Once the SBC 122 receives the IP call signal, the SBC 122 can perform call-control functions to the IP call signal. Then, the SBC 122 passes (320) the IP call signaling to the application server 121.

After receiving the IP call signaling from the SBC 122, the application server 121 queries (325) the position server 142 at the Service Bureau 140. The application server 121 communicates the telephone number or any other identification number of the IP device 171 to the position server 142.

After the Service Bureau 140 has been queried, the position server 142 accesses the location database 144 and, based on the telephone number or other identification of the remote IP device, transmits (330) ESRN and ESQK parameters to the application server 121 at the local service provider footprint 120. The ESRN can facilitate routing to the appropriate selective router, for this example selective router 174, and the ESQK can facilitate routing to the correct PSAP, for this example PSAP 175.

After the application server 121 receives the ESRN and ESQK data, the application server 121 signals (335) to the gateway controller 123 located at the local service provider footprint 120 to connect, via network 160, to gateway 173 located at the remote service provider footprint 170.

The application server 121 can then remove the "911" and populate the called party number with a 10 digit number, which the gateway controller 123 can recognize as an emergency call destined to the selective router 174. In turn the gateway controller 123 removes this 10 digit number and populates the called party number with "911". As a result, the gateway controller 123 connects (340) and provides the ESQK to the gateway 173 located at the remote service provider footprint 170, for example, via network 160.

After the gateway controller 123 connects to the gateway 173, the remote IP device 171 establishes (345) Real Time Protocol (RTP) communications with the SBC 122 at the local service provider footprint 120 via network 150. As a result, the remote IP device 171 establishes (350) RTP communications with the gateway 173 through the SBC 122 via networks 150, 160. Then, gateway 173 converts the communication from IP to Time Division Multiplexing (TDM). The gateway 173 then passes (355) the direct trunking (TDM trunk) and the ESQK to the selective router 174.

The router 174 connects (360) the call (now TDM-based) to the PSAP 175, located at the remote service provider footprint 170, using the E911 trunks that are based on the ESQK values. As a result, the PSAP 175 queries (365) the ALI database 176 to obtain the remote IP device's ALI and ANI data to be displayed at the operator console of the PSAP 175. If the ALI database 176 has the ALI and the ANI data, the ALI and ANI data is transmitted (380) to the operator console at the PSAP 175.

However, if the ALI and ANI data are not stored in the ALI database 176, the ALI database 176 performs a steering operation (370), based on the ESQK, to the location database 144 at the Service Bureau 140 to obtain the ALI data and the ANI data. The location database 144 provides (375) the ANI and ALI data to the ALI database 176 at the remote service provider footprint 170. As a result, the ALI database 127 forwards (380) the ALI and ANI data to the PSAP 175 where it is displayed at the operator's console. The ALI and ANI data allow an operator to determine the location of the user of the remote IP device.

Figure 4:
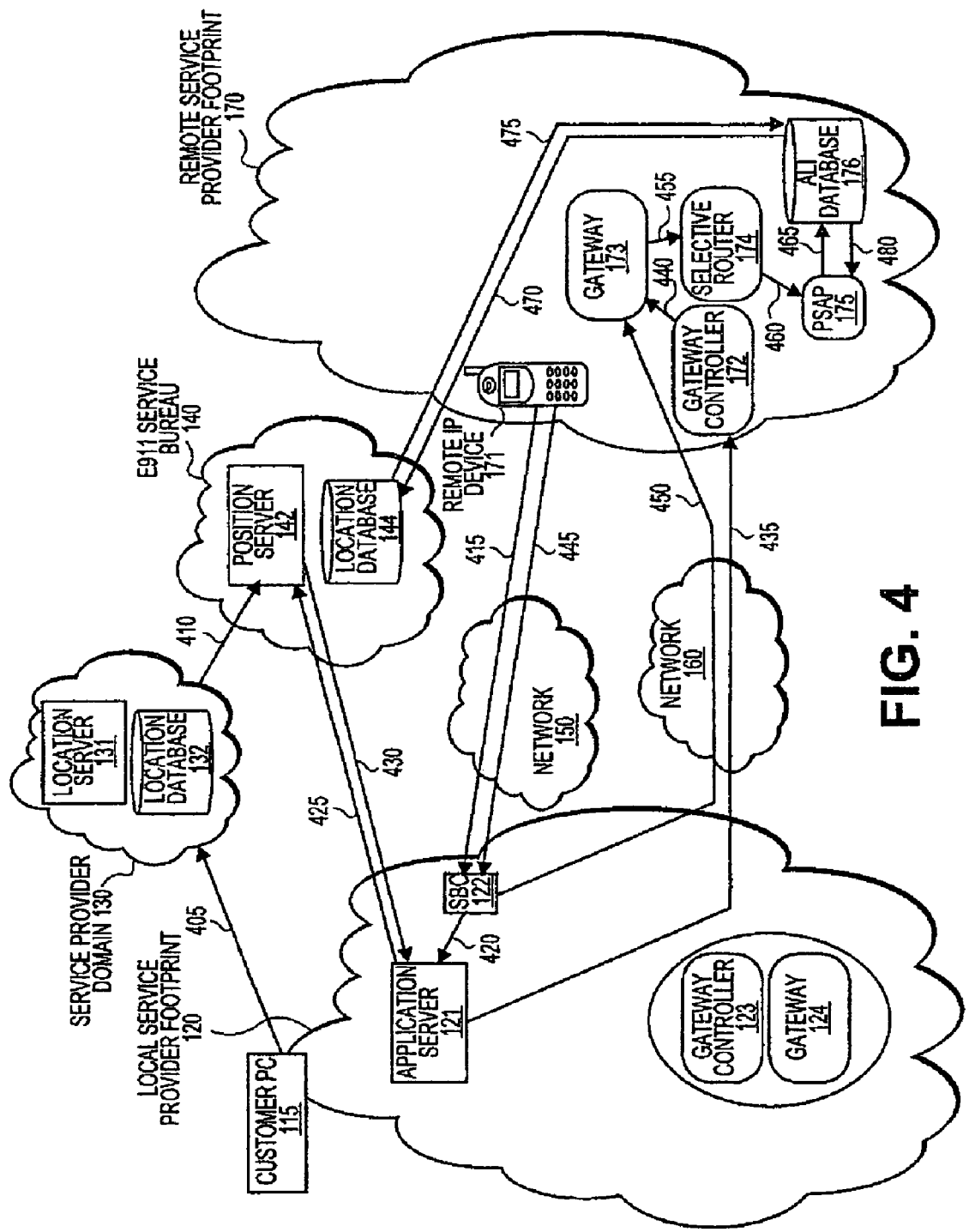
FIG. 4 is a functional diagram showing a second alternative call flow in the exemplary system in FIG. 1 for providing emergency communication for a nomadic emergency caller.

FIG. 4 illustrates an alternate embodiment to that of FIG. 3. The call processing illustrated in FIG. 4 is similar to that of FIG. 3, except that the application server 121 signals (435) to the gateway controller 172 located at the remote service provider footprint 170 (instead of the local gateway controller 123), which accordingly connects with (440) and provides the ESQK to the gateway 173.

Figure 5:
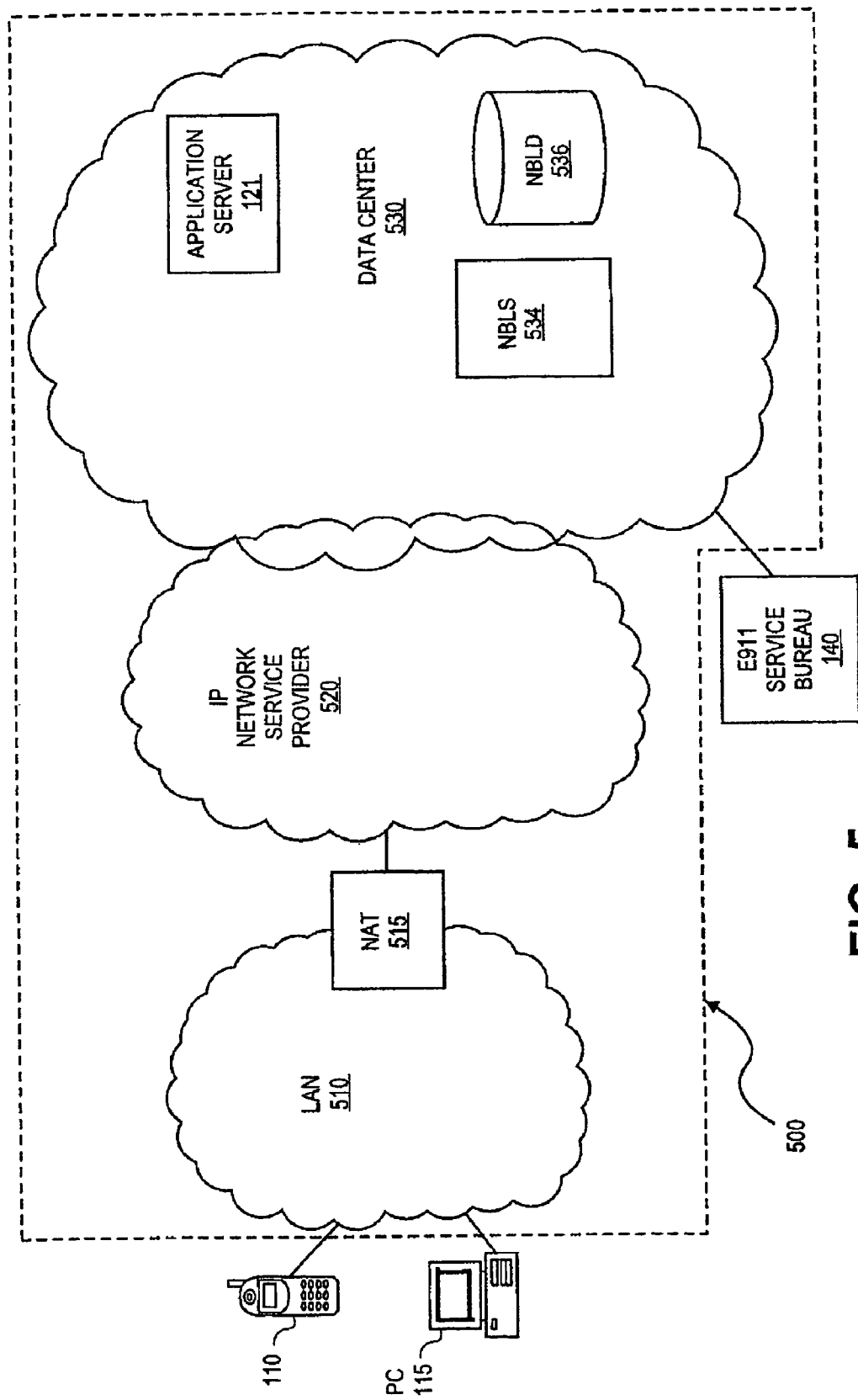
FIG. 5 is a block diagram of an exemplary system for providing registration and re-registration of an IP device at a location server.

FIG. 5 is a block diagram of an exemplary system for providing registration and re-registration of an IP device 110. The exemplary system includes an IP device 110, a PC 115, an E911 Service Bureau 140, and a network-based system 500. Network-based system 500 includes a local area network (LAN) 510, an IP Network Service Provider 520, and a data center 530.

LAN 510 is a group of computers and associated devices that share a common communications line or wireless link and typically share the resources of a single processor or server within a small geographic area, such as an office building or small neighborhood. Usually, the server has applications and data storage that are shared in common by multiple computer users. A LAN may serve as few as two or three users (for example, in a home network) or as many as thousands of users (for example, in an FDDI network). In some embodiments, as described below, a LAN could be replaced by multiple devices being connected to a WAN, such as broadband (DSL or Cable modem) service providers.

Network address translation (NAT) facility 515 is located on the fringe of the LAN 510 to prevent external users from learning the internal IP addresses of the LAN. NAT 515 enables a LAN 510 to use one set of IP addresses for internal traffic and a second set of IP addresses for external traffic. This enables multiple hosts on a private network to access the Internet using a single public IP address. As communication traffic passes from the LAN to the IP network service provider 520, the source address on the data packets are translated from private IP addresses to public IP addresses. Typically, a company translates its private IP addresses to one or more public IP addresses and un-translates the public IP addresses on incoming packets back into private IP addresses. NAT is included as part of a router and can often be part of a corporate firewall.

IP Network Service Provider 520 provides direct backbone access to the internal network for users and usually access to its network access points. In some embodiments, the IP Network Service-Provider 520 includes a switch (e.g. an Ethernet switch). The switch allows for multiple IP devices 110 or 171, such as a softphone on a PC 115 or a second hard phone at an office or home, using the same phone number to connect to the application server 121.

Figure 8:
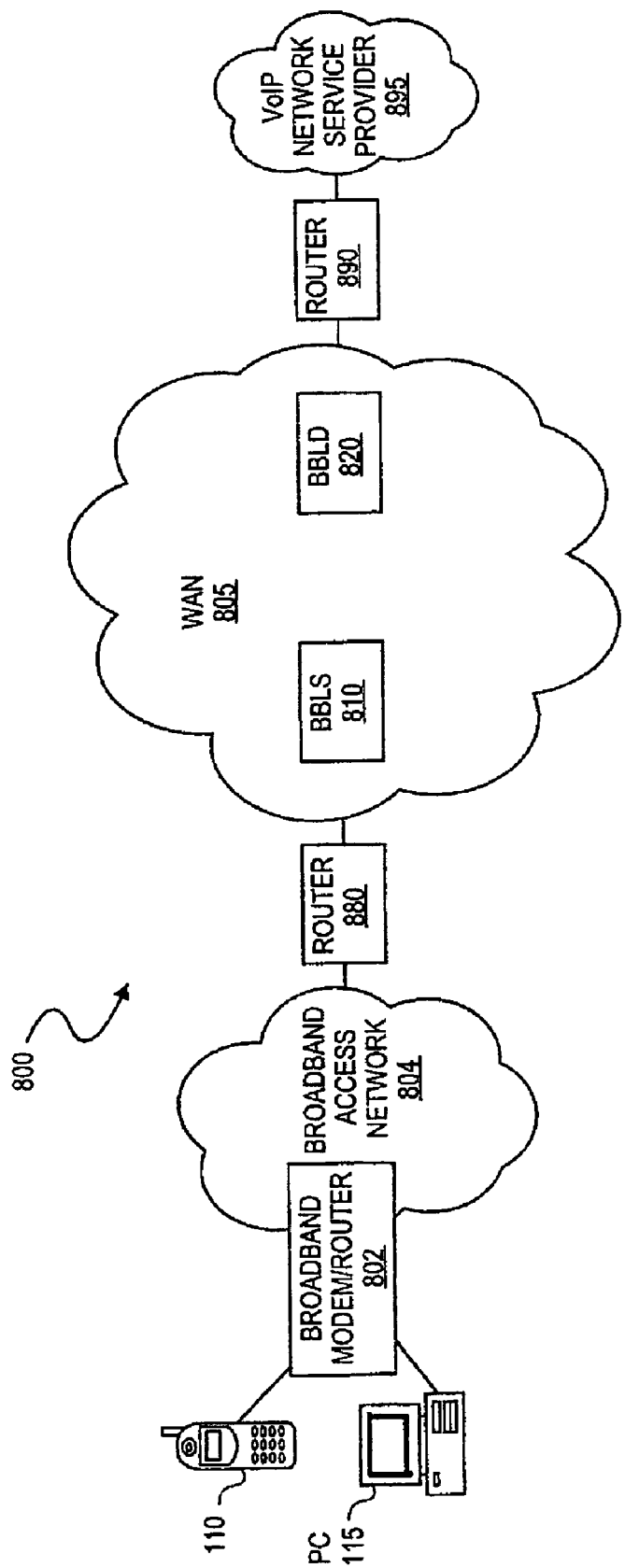
FIG. 8 is a block diagram or an exemplary system for updating location information in a broadband access network.

Data Center 530 includes several components that assist with the registration and the re-registration of the IP device 110 or 171. In some embodiments, the IP device provides identification data to the network to determine the location of the IP device. The data center 530 can include, among other things, an application server 121, a network-based location server (NBLS) 534, and a network-based location database (NBLD) 536. For example, data center 530 can be an Internet Telephone Service Provider data center. In some embodiments, the data center can include an IP Centrex Call Server (IPCS). IPCS has the ability to register the IP devices after a predetermined or random period of time and communicate the registration information to the application server 121 and the NBLS 534. In some embodiments, as shown in FIGS. 6 and 8, Data Center 530 is included within the IP Network Service Provider 520.

NBLS 534 is a server that obtains information about an IP device's possible location. For example, the NBLS 534 is used in conjunction with VoIP phone service. NBLS 534 creates mappings of the IP device's telephone number or device identity to a physical address based on the internal and external IP subnets used at that physical address. NBLS 534 verifies these mappings to determine if the IP device is at a known physical location whenever the IP device attempts to register and re-register. If the registration attempts reveal an external or internal IP address that does not map to the IP subnets associated with the home location of that device, the NBLS 534 marks the device as being in a roaming state and attempts to determine the new physical location by querying the NBLD. If the NBLD can not provide a physical location for the new IP addresses of the device, the NBLS will either need to query an EBLS (further discussed below) or the end user to obtain physical address information. In some embodiments, the NBLS 534 can enable multiple devices at different locations to share a single telephone number by using IP subnets to determine the location of the IP device 110 user. Also, NBLS 534 provides location updates to the location database 144 at the E911 Service Bureau 140. NBLS can be the location server described in "E911 Location Server" (Ser. No. 11/274,301), which is incorporated herein by reference.

NBLD 536 is a database that stores pertinent data for the NBLS 534. For example, when a business signs up for an IP telephone service, the enterprise can provide the service provider with an inventory mapping of external IP addresses and internal IP subnets that are used at each physical address. The mapping can also include IP address and subnets that are assigned to remote users that connect to the enterprise network via VPN. The service provider assigns the customer certain telephone numbers to be used by IP device 110 at various locations. The NBLS 534 can create location information to be stored at the NBLD 536. The location information stored at the location database can include, among other things, the device identity, the telephone numbers, location status, physical addresses, external IP addresses, customer's internal IP subnets, and ALI Direct Inward Dial (DID) numbers. In some embodiments, the device identity is the SIP UserID that identifies the SIP endpoint. In some embodiments, the device identity could be the same as the telephone number, the telephone number with some appended characters identifying a particular device or some other unique identifier. The location status, for example, is used to indicate whether the telephone number is unregistered (U), at the physical home address (H) where the telephone number was first assigned by the service provider, or roaming (R) to a new site. The customer's internal IP subnets can be either private addresses as defined by RFC 1918 or publicly routable IP addresses. In some embodiments where one or more external IP addresses are shared by multiple physical addresses, it is assumed that the private IP subnets can be mapped to well-defined physical addresses. The service provider may require the customer to impose a stable mapping of IP subnets to physical locations so that the emergency call network 100 can locate the user in an emergency situation.

Figure 6:
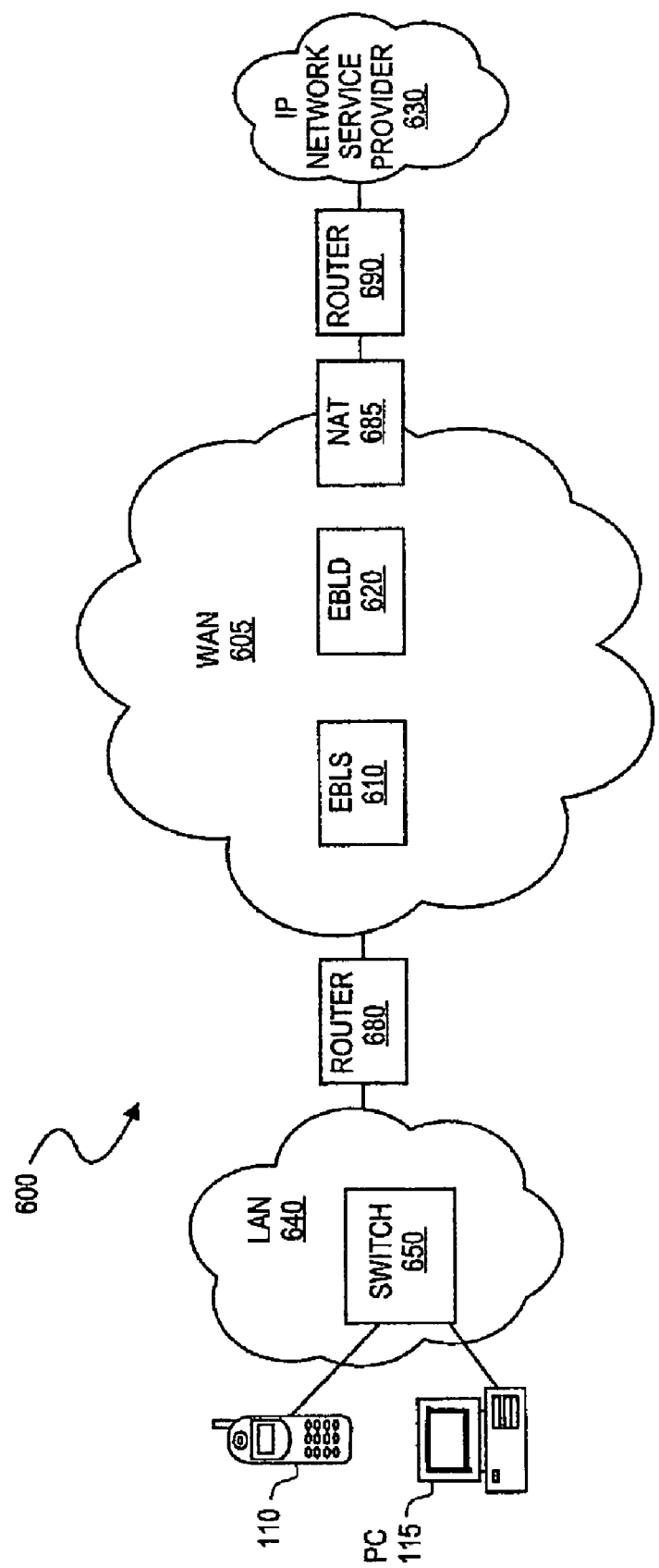
FIG. 6 is a block diagram of an exemplary system for updating location information at an enterprise.

FIG. 6 is a block diagram of an exemplary system for updating location information at an enterprise. The enterprise service network 600 can include a business entity that may have several business locations, an extended campus, or a large building, such as a multi-story office building. The enterprise network 600 may have one or more LANs deployed at several sites within the enterprise. The illustrated enterprise service network 600 includes an IP device 110 and/or a PC 115 that attach to a LAN 640 or other IP devices that can initiate VoIP calls. LANs are typically built using Ethernet switches 650 that interconnect to form LAN segments, but can utilize any technology, such as a token ring or 802.11 wireless LAN. In some embodiments, the IP device 110 or PC 115 connect to the port on a switch 650. LAN segments may be interconnected using IP routers 680 that are interconnected to each other via, for example, an enterprise Wide Area Network (WAN) 605. As is well known, router 680 may be a device or software that determines the next network point to which data, such as an IP data packet, should be forwarded toward its destination. For example, the router 680, which is connected to the LAN 640 and the WAN 605, may determine which router to send data based on the router's current understanding of the state of the LAN 604 and WAN 605. In some embodiments, a router may be connected between LAN 640 and an IP Network Service Provider 630.

The exemplary enterprise network 600 can include a WAN 605 that includes enterprise-based location server (EBLS) 610 and enterprise-based location database (EBLD) 620. In some embodiments, the EBLS and EBLD could also be in the LAN 640. In some embodiments, the WAN includes multiple network-based systems and routers, which can include one or more additional IP devices. For example, WAN 605 includes routers, such as router 690, that connect to the public Internet or to a service provider's public or private network, such as IP network service provider 630 (which may provide a network-based system 500 as shown in FIG. 5). In some embodiments, the LAN or WAN includes an Internet Protocol Private Branch Exchange (IP PBX), which can register an IP device, such as an IP phone.

EBLS 610 is a server that obtains information about an IP device's possible location with the enterprise network. For example, the EBLS 610 is used in conjunction with VoIP phone service. If the NBLS 534, shown in FIG. 5, detects that a device's IP address has changed and a query to the NBLD can not determine the device's location based on the new IP address, the NBLS can query the EBLS 610 for updated location information. For example, the NBLS 534 can communicates with the EBLS 610 by using the SIP SUBSCRIBE/NOTIFY method to communicate. In the latter case, NBLS can transmit a SIP NOTIFY message to the EBLS 610 to be notified of a change to a device's internal or external IP addresses or its physical location.

EBLD 620 is a database that stores pertinent data for the EBLS 610. For example, when a business signs up for an IP telephone service, the EBLD 620 can provide the service provider with an inventory mapping of external IP addresses and internal IP subnets that are used at each physical address. EBLD 620 includes a table that provides the physical address of every enterprise-based switch or router. EBLD 620 further includes a second table that stores the IP addresses, the switch port numbers, and the identity of the switch where the IP device is attached. In some embodiments, the EBLS may contain a method that queries any switches or routers on the LANs and/or WAN to determine the IP address of attached devices, the associated switch port number, and the switch identity. In such embodiments, the EBLS will be able to automatically generate a mapping of IP device's IP addresses to physical locations that can be stored in the EBLD.

In some embodiments, the table can include an Emergency Number Identifier (ENI). The ENI may function as a Direct Inward Dial (DiD) identifier that can be assigned by the enterprise administrator for every distinct physical address within the enterprise. For example, the physical address may pertain to a single building, a group of closely located buildings, or the floor or wing of a larger office building. When an emergency call is made from that location, the ENI can be used as the ANI for the emergency call. The ENI will be the telephone number that is entered into the ALI database and associated with that physical address.

Figure 7:
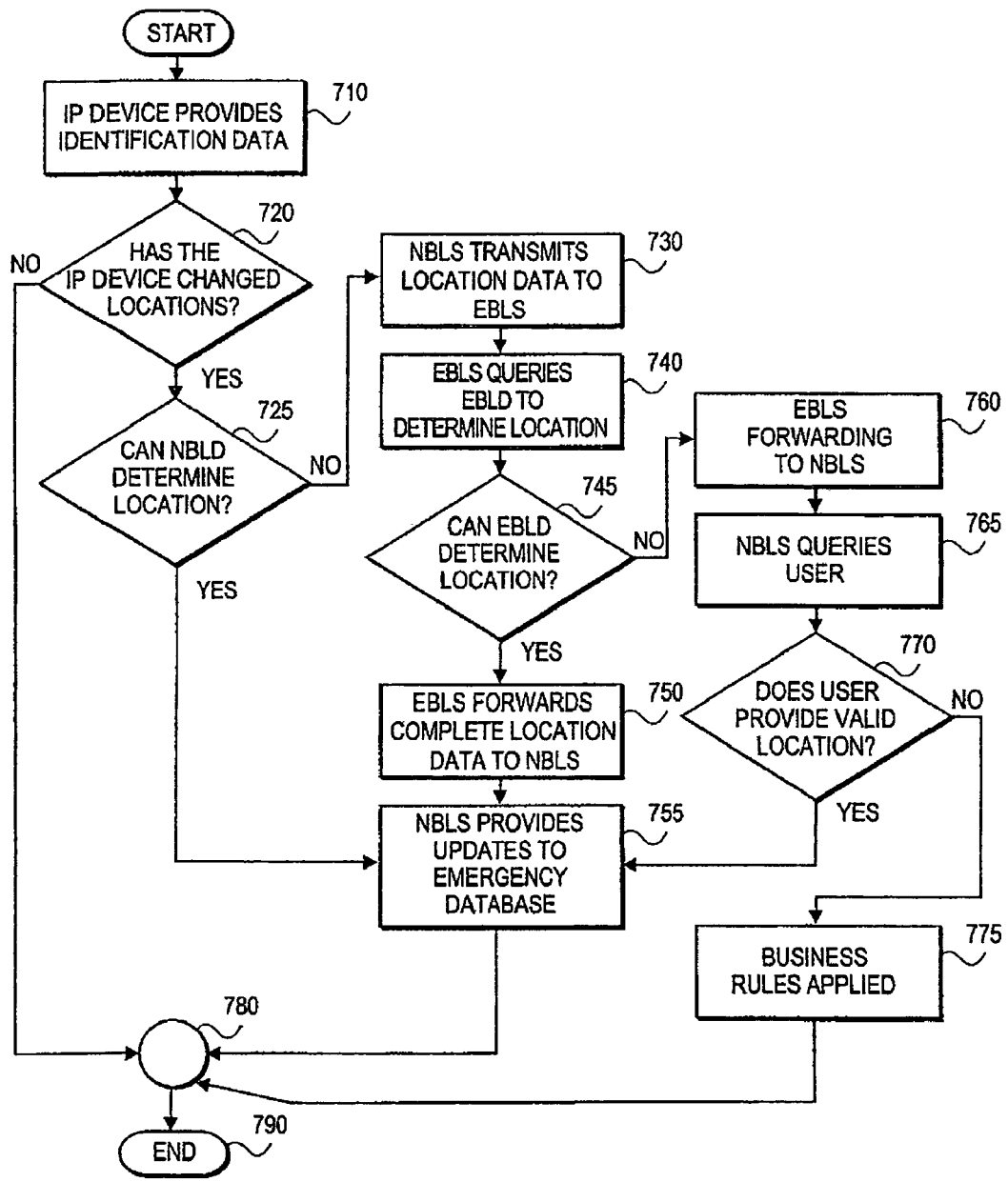
FIG. 7 is a flowchart representing an exemplary method for mapping an IP device.

FIG. 7 is a flowchart representing an exemplary method for mapping an IP device. In this exemplary embodiment, it is assumed that an IP device is connected to an enterprise network and the enterprise network is connected to a network service provider and a data center. First, the IP device provides (710) identification data to the network-based system. In some embodiments, the IP device registers with the network-based system. In some embodiments, the IP device registers with the IPCS located at a data center in the network-based system. In some embodiments, the IP device registers with the IP-PBX located at the WAN or at a LAN. In addition, IP devices can be programmed to register and re-register every few minutes. When the IP device registers or re-registers with the network-based system, the IP device sends a REGISTER message containing an external IP address of an enterprise's edge router as source address for the data packet when a NAT translates the data. In addition, the REGISTER message can include a SIP message that contains the IP device's unique identity, its telephone number, and/or the internal IP address in SIP header fields, such as the call ID, contact header, or the via header. If the IP device obtains a public address directly, the IP address of the packet and the SIP header contains the same values.

After the IP device provides identification data, the NBLS determines (720) whether the IP device has changed locations. As described in patent application Ser. No. 11/274,301, which has been incorporated herein, the NBLS receives information concerning the device's identity, and its internal and external IP address(es). If the IP addresses of the IP device have not changed, the method proceeds to connector 780 and the procedure ends.

On the other hand, if the IP device's IP addresses have changed, the NBLS first queries the NBLD to determine (725) the location of the IP device based on the new IP addresses. If the NBLD can determine the location data, the NBLS can provide updates to an emergency database (755), such as an ALI database and/or an E911 Service Bureau, which allows an operator to determine a caller's location when an E911 call is placed. In some embodiments, the emergency database confirms whether the updated location data is accepted.

If a determination cannot be made, the NBLS transmits (730) location data, such as internal and external IP addresses, to the EBLS. The EBLS receives changed location data that includes internal and external IP address of the IP device.

After the EBLS receives the change data, the EBLS queries (740) an EBLD. The EBLD uses the internal and/or external IP addresses of the IP device to scan through stored data of network switches and routers that support those particular internal and/or external IP addresses. The EBLS determines whether the EBLD can determine (745) the location of the IP device. If so, once the location database finds a match, the EBLD returns the physical address of the switch or router that supports the IP device's IP address. In some embodiments, the EBLS can map every switch and/or router to the appropriate physical address and the associated emergency number identifier (ENI).

After the EBLS has located the switch or router data, the EBLS forwards (750) the switch or router information to the NBLS located at the network-based system. For example, when the EBLS transmits to the NBLS the updated location data for the IP device, the location information could include updated ENI data for that IP device. Then, the NBLS can provide (755) the physical location data for that device to an emergency database, such as an ALI database and/or an E911 Service Bureau's database. When an E911 call is made, this location information can be presented to an operator at a PSAP to determine a caller's location. In some embodiments, for any E911 call, the IPCS or IP-PBX queries the NBLD to determine the correct ENI for that call and place the ENI in the Contact field or From field of the SIP INVITE or other any other SIP header. In some embodiments, the ALI database stores an emergency direct inward dial (DID) identifier for every distinct physical address of the enterprise as required by E911 specifications. The emergency DID can be referred to as an ENI. ENI enables selective routers to direct the call to the correct PSAP and for the ALI database to provide correct physical address information. Alternatively, the IPCS can query the location server at the E911 Service Bureau. The method proceeds to connector 780 and the procedure ends.

If the EBLD cannot determine (745) the location of the IP device, the EBLS forwards (760) the unknown location data to the NBLS. The NBLS has business rules that determine how to treat an IP device at an unknown location. In some embodiments, the business rules could include the NBLS attempting to querying (765) the IP device or the user to determine the present physical address for the IP device. The NBLS can contact the user by several means, which can include placing a call to the telephone number, sending a text message or page, sending an e-mail, sending an instant message (IM), or activating a dialogue window in a soft client on the device. Consequently, the user provides location information to the NBLS by either entering the user's physical address at a website, sending a text message with the IP device's location, or responding to a dialogue window opened on the device or on the user's PC. It may be appreciated by one of ordinary skill that any messaging means can be used to request address information to the user and to transmit address information to the emergency call system 100. In some embodiments, the IP device itself may have means to determine its own location using a Global Positioning System or other means. In this case, the NBLS can query the device to determine its physical location as provided by a geocode or other means for location identification.

After the user or the device provides location information to the NBLS, the NBLS determines (770) whether the location information is valid location information by validating the address information against a standard address directory such as a Master Street Access Guide (MSAG). If the NBLS does not receive acceptable location information, the NBLS may perform (775) one or more additional business rules. These business rules can include: repeating the request for location information, placing a phone call to the user at the telephone number and informing the user that the VoIP phone cannot be used for 911 calls, requesting an acknowledgement that the user is unable to provide address information, deregistering the phone, or informing the user to take other actions if there is a need to make an emergency call.

If the NBLS receives an acceptable address from the user, the accepted location information is entered into the NBLD as the new physical address. Consequently, the NBLS provides (755) the location information to the emergency database. The method proceeds to connector 780 and the procedure ends.

FIG. 8 is a block diagram or an exemplary system for updating location information as may be specifically applicable to wide area access networks, such as a "broadband" access network. A broadband service network 800 can be used by a business entity that may have one or several business locations or points of presence, or by residential subscribers. The broadband service network 800 may use one or more broadband access networks 804. The broadband service network 800 includes an IP device 110 and/or a PC 115 that attaches to the broadband access network 804 via a broadband modem/router 802, such as a DSL modem, a cable modem, wireless LAN/WAN interface device, or other type of broadband modem. The modem may have a router built in as shown in the diagram, or the router may be deployed as a separate device local to device 110/PC 115, or within broadband access network 804. The broadband access network 804 may itself be connected using a router 880 to a Wide Area Network (WAN) 805. WAN 805 may be further connected, for example, via one or more routers 890, to the public Internet, to service provider's public or private network, and/or to a service provider such as a VoIP network service provider 895, which may provide a network-based system 500 as shown in FIG. 5. In some embodiments, the broadband access network 804 may be directly connected (e.g., via routers) to the public Internet, to service provider's public or private network, and/or to a service provider such as a VoIP network service provider 895. In some embodiments, the broadband access network 804 or WAN 805 includes (or is attached to) an Internet Protocol Private Branch Exchange (IP PBX), which can register an IP device, such as an IP phone.

The exemplary broadband service network 800 includes a WAN 805 that includes broadband-based location server (BBLS) 810 and broadband-based location database (BBLD) 820. In some embodiments, the BBLS and BBLD could also be in the broadband access network 804. BBLS 810 is a server that obtains information about an IP device's possible location. For example, the BBLS 810 is used in conjunction with VoIP phone service. In addition, NBLS 534 can query the BBLS 810 if any IP address or physical location change is detected by the NBLS 534. For example, the NBLS can use the SIP SUBSCRIBE/NOTIFY method to communicate with BBLS 810. The BBLS 810 will send a NOTIFY message to NBLS 534 when changes are made to the BBLD 820.

BBLD 820 is a database that stores pertinent data for the BBLS 810. For example, when a subscriber or business signs up for an IP telephone service, the BBLD 820 can provide the service provider with an inventory mapping of external IP addresses and internal IP subnets that are used at each physical address. BBLD 820 includes a table that provides the physical address of every customer-based router, which has been assigned an external IP address. BBLD 820 further includes a second table that stores the IP addresses and the identity of the router which connects to the LAN where the IP device is attached. In some embodiments, the BBLS may contain a method that queries any router local to the subscribers (e.g., on LANs and/or WANs attached to the broadband access network 804) to determine the IP address of attached devices, the associated switch port number, and the switch identity. In such embodiments, the BBLS will be able to automatically generate a mapping of IP device's IP addresses to physical locations that can be stored in the BBLD.

In the case of broadband services to subscribers or small businesses, the BBLD can contain a physical mapping of the Broadband access network. In the case of DSL, there could be a mapping of the physical termination point of the copper loop where the DSL modem is located. The BBLS may also have means to determine the IP address assigned to the DSL modem. The BBLS can provide this IP address to the BBLD to complete the mapping of the IP address to the physical location.

In the case of other physical access networks such as cable TV networks, wireless networks, or optical fiber networks, the BBLD can contain a mapping of a physical node. For example, the physical node can be a co-axial cable connection point, an optical fiber splitter point, or a wireless access point. The physical node provides a physical location for where the device connects to the access network. The BBLS can have means to determine the IP address assigned to the subscriber and to provide the relevant IP address information to the BBLD.

Figure 9:
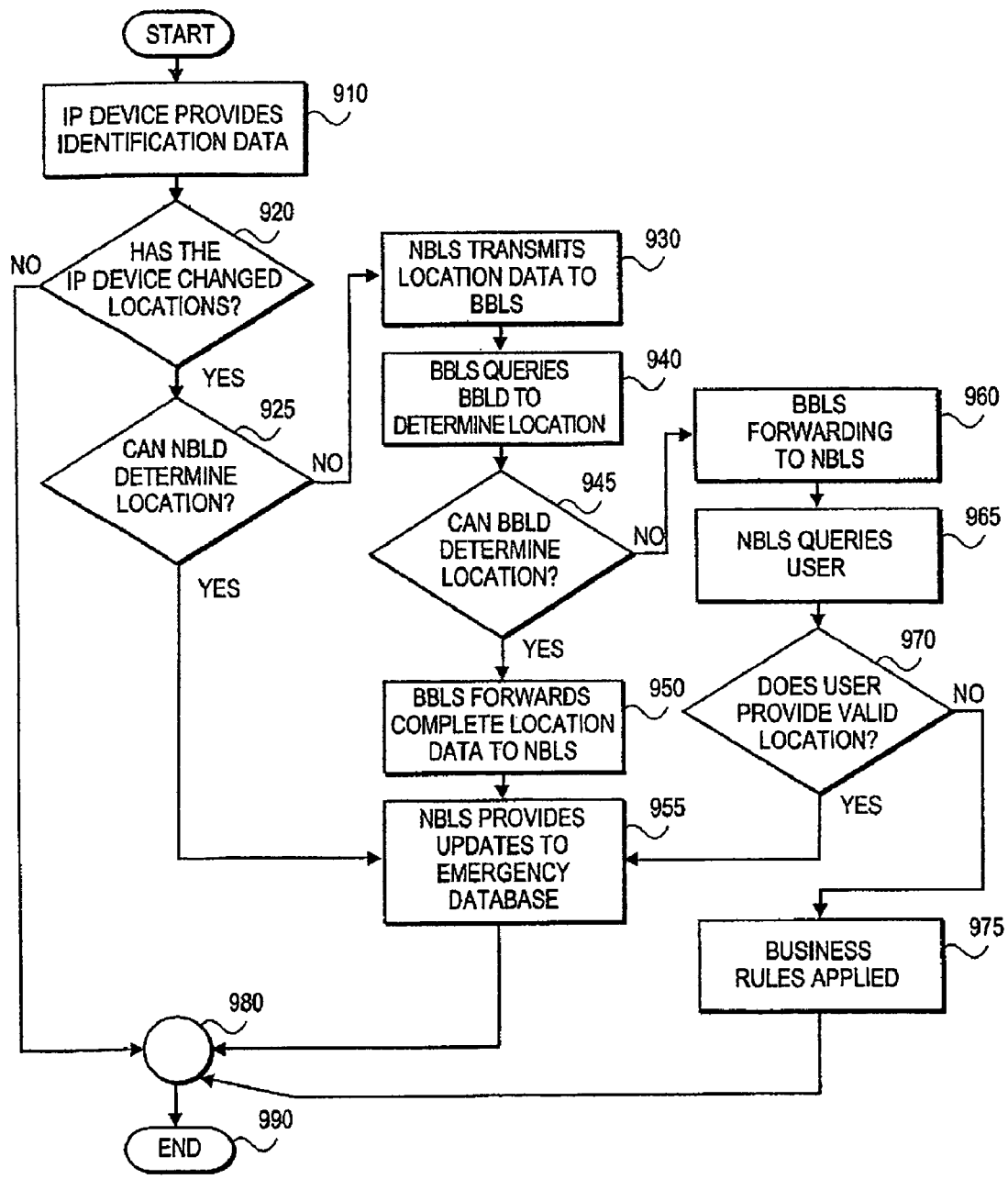
FIG. 9 is a flowchart representing an exemplary method for mapping an IP device in a broadband service network.

FIG. 9 is a flowchart representing an exemplary method for mapping an IP device in a broadband service network. In this exemplary embodiment, it is assumed that an IP device is connected to a broadband access network and the broadband access network is connected to a VoIP service provider and a data center. First, the IP device provides (910) identification data to the broadband access system. In some embodiments, the IP device registers with the broadband access network. In some embodiments, the IP device registers with the IPCS located at a data center in the VoIP network service provider's system. In some embodiments, the IP device registers with the IP-PBX located at the broadband access network or WAN. In addition, IP devices can be programmed to register and re-register every few minutes. When the IP device registers or re-registers with the broadband access system, the IP device sends a REGISTER message containing an external IP address of the subscriber's edge router as source address for the data packet when a NAT translates the data. In addition, the REGISTER message can include a SIP message that contains the IP device's unique identity, its telephone number, and/or the internal IP address in SIP header fields, such as the call ID, contact header, or the via header. If the IP device obtains a public address directly, the IP address of the packet and the SIP header contains the same values.

After the IP device provides identification data, the NBLS determines (920) whether the IP device has changed locations. As described in patent application 05-1414, which has been incorporated herein, the NBLS receives information concerning the device's identity, and its internal and external IP address(es). If the IP addresses of the IP device have not changed, the method proceeds to connector 980 and the procedure ends.

On the other hand, if the IP device's IP addresses have changed, the NBLS first queries the NBLD to determine (925) the location of the IP device based on the new IP addresses. If the NBLD can determine the location data, the NBLS can provide updates to the to an emergency database, such as an ALI database and/or an E911 Service Bureau, which allows an operator to determine a callers location when an E911 call is placed. In some embodiments, the emergency database confirms whether the updated location data is accepted.

If a determination cannot be made, the NBLS transmits (930) location data, such as internal and external IP addresses, to the BBLS. The BBLS receives updated location data that includes internal and external IP address of the IP device.

After the BBLS receives the updated location data, the BBLS queries (940) the BBLD. The BBLD uses the internal and/or external IP addresses of the IP device to scan through stored data of network switches and routers that support those particular internal and/or external IP addresses. The BBLS determines whether the BBLD can determine (945) the location of the IP device. If so, once the location database finds a match, the BBLD returns the physical address of customer's edge modem/router that supports the IP device's IP address. In some embodiments, the BBLS can map every external IP address to the appropriate physical address.

After the BBLS has located the physical address data, the BBLS forwards (950) the address information to the NBLS located at the network-based system. Then, the NBLS can provide (955) the physical location data for that device to an emergency database, such as an ALI database and/or an E911 Service Bureau, which allows an operator to determine a caller's location when an E911 call is placed. Alternatively, the IPCS can query the location server at the E911 Service Bureau. The method proceeds to connector 980 and the procedure ends.

If the BBLD cannot determine (945) the location of the IP device, the BBLS forwards (960) the unknown location data to the NBLS. The NBLS has business rules that determine how to treat an IP device at an unknown location. In some embodiments, the business rules could include the NBLS attempting to query (965) the IP device or the user to determine the present physical address for the IP device. The NBLS can contact the user by several means, which can include placing a call to the telephone number, sending a text message or page, sending an e-mail, sending an instant message (IM), or activating a dialogue window in a soft client on the device. Consequently, the user provides location information to the NBLS by either entering the user's physical address at a website, sending a text message with the IP device's location, or responding to a dialogue window opened on the device or on the user's PC. It may be appreciated by one of ordinary skill that any messaging means can be used to request address information to the user and to transmit address information to the emergency call system 100. In some embodiments, the IP device itself may have means to determine its own location using a Global Positioning System or other means. In this case, the NBLS can query the device to determine its physical location as provided by a geocode or other means for location identification.

After the user or the device provides location information to the NBLS, the NBLS determines (970) whether the location information is valid location information by validating the address information against a standard address directory such as MSAG. If the NBLS does not receive acceptable location information, the NBLS may perform (975) one or more additional business rules. These business rules can include: repeating the request for location information, placing a phone call to the user at the telephone number and informing the user that the VoIP phone cannot be used for 911 calls, requesting an acknowledgement that the user is unable to provide address information, de-registering the phone, or informing the user to take other actions if there is a need to make an emergency call.

If the NBLS receives an acceptable address from the user, the accepted location information is entered into the NBLD as the new physical address. Consequently, the NBLS provides (955) the location information to the emergency database. The method proceeds to connector 980 and the procedure ends.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A system comprising:
   a first network configured to receive IP device data from an IP device and to provide a plurality of Internet Protocol (IP) addresses of the IP device based on the IP device data, wherein the plurality of IP addresses includes an internal IP address internal to the first network and an external IP address external to the first network, the first network comprising:
      a first network location server configured to determine whether the IP device has changed its location based on the plurality of IP addresses; and
   a second network comprising:
      a second network location database configured to store physical location information, and
      a second network location server configured to receive, from the first network, the plurality of IP addresses of the IP device based on the determination by the first network location server, and query the second network location database to determine physical location information of the IP device based on the internal IP address or the external IP address, wherein the physical location information of the IP device is provided to a service bureau, which is external to both the first network and the second network, for storage.

2. The system of claim 1, wherein the first network location server is configured to receive the physical location information from the second network location server and update the first network location database based on the physical location information.

3. The system of claim 1 further comprising a switch configured to provide communications between the first network and the second network, wherein the second network location server determines the location of the IP device based on the location of the switch.

4. The system of claim 1 further comprising a router configured to provide communications between the first network and the second network, wherein the second network location server determines the location of the IP device based on the location of the router.

5. The system of claim 1 wherein the second network is one of an enterprise based network or a broadband access network.

6. A method comprising:
   receiving a plurality of Internet Protocol (IP) addresses of an IP device from a first network, wherein the first network includes a first network location server and wherein the plurality of IP addresses includes an internal IP address internal to the first network and an external IP address external to the first network;
   querying a location database using the plurality of IP addresses;
   receiving location information from the location database, wherein the location information correlates to the internal IP address or the external IP address;
   determining whether physical location of the IP device can be identified based on the location information; and
   transmitting the location information for updating the location information stored at a service bureau, which is external to the first network.

7. The method of claim 6, further comprising transmitting the physical location of the IP device to the first network.

8. The method of claim 7, wherein the first network forwards the location of the IP device to a service bureau.

9. The method of claim 6, wherein the querying a location database includes providing the internal IP address or the external IP address of the IP device to the location database.

10. The method of claim 9, wherein the receiving location information includes receiving the location of a switch from the location database, wherein the switch correlates to the internal IP address or the external IP address of the IP device for determining the physical location of the IP device.

11. The method of claim 8, wherein the location information is the physical location of the IP device.

12. A method for updating location information of an IP device at a first network, the method comprising:
   receiving IP device data information from the IP device, the IP device data including registration information and a plurality of Internet Protocol (IP) addresses, wherein the plurality of IP addresses includes an internal IP address internal to the first network and an external IP address external to the first network;
   determining whether the IP device has changed locations based on the plurality of IP addresses;
   transmitting at least one IP address of the plurality of IP addresses to a second network having a network location server when the IP device has changed locations, wherein the at least one IP address of the plurality of IP addresses correlates to a network location of the IP device and the received registration information;

receiving location information from the network location server, wherein the location information correlates to the internal IP address or the external IP address associated with the IP device and assists in determining a current physical location of the IP device; and communicating the location information to a service bureau, which is external to both the first network and the second network, for updating the location information of the IP device stored at the service bureau.

13. The method of claim 12, wherein the receiving location information includes receiving switch information from the network, wherein the switch information assists in determining the location of the IP device.

14. The method of claim 12, wherein the location information is a physical location of a switch or a router.

15. A system including a first network and a second network, the system comprising:

a second network location database configured to store physical location information correlated to network location information;

a second network location server connected to the second network location database and the first network having a first network location server, the second network location server configured to receive a plurality of IP addresses of an IP device from the first network wherein the plurality of IP addresses includes an internal IP address internal to the first network and an external IP address external to the first network, supply the internal IP address or the external IP address to the second network location database, receive location information from the second network location database wherein the location information includes physical location information of the IP device, determine whether the physical location of the IP device can be identified based on the location information, and communicate with the first network location server based on the determination so that the first network location server can assist in locating the IP device, and wherein the location information is used for updating the location information stored at a service bureau, which is external to both the first network and the second network.

16. The system of claim 15, wherein the location information includes at least one of: physical location and identity of a switch, or a physical location and identity of a router.

17. The system of claim 16, wherein the location information includes an emergency number identifier.

* * * * *